United States Patent
Mola (10) Patent No.: US 10,671,512 B2
(45) Date of Patent: Jun. 2, 2020

(54) PROCESSOR MEMORY REORDERING HINTS IN A BIT-ACCURATE TRACE

(71) Applicant: Microsoft Technology Licensing, LLC, Redmond, WA (US)

(72) Inventor: Jordi Mola, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/168,404

(22) Filed: Oct. 23, 2018

(65) Prior Publication Data

US 2020/0125479 A1  Apr. 23, 2020

(51) Int. Cl.
G06F 9/44 (2018.01)
G06F 11/36 (2006.01)
G06F 11/34 (2006.01)

(52) U.S. Cl.
CPC ...... *G06F 11/3636* (2013.01); *G06F 11/3476* (2013.01); *G06F 11/3624* (2013.01); *G06F 2201/865* (2013.01)

(58) Field of Classification Search
CPC .................................................. G06F 11/3636
USPC ........................................................ 717/128
See application file for complete search history.

(56) References Cited

U.S. PATENT DOCUMENTS

| | | | | |
|---|---|---|---|---|
| 6,349,361 B1* | 2/2002 | Altman | .................. | G06F 9/3834 711/121 |
| 7,562,190 B1* | 7/2009 | Koster | ................ | G06F 12/0804 711/118 |
| 8,595,441 B1* | 11/2013 | Nakibly | ................ | G06F 12/084 711/130 |
| 2009/0328045 A1* | 12/2009 | Burckhardt | ........... | G06F 9/3842 718/102 |
| 2015/0120996 A1* | 4/2015 | Pokam | ................ | G06F 9/30043 711/105 |
| 2015/0261461 A1* | 9/2015 | Li | ........................ | G11C 16/06 711/135 |
| 2017/0123844 A1* | 5/2017 | Gschwind | ........... | G06F 12/0842 |
| 2017/0123846 A1* | 5/2017 | Gschwind | ............... | G06F 16/35 |

(Continued)

FOREIGN PATENT DOCUMENTS

WO  2018089278 A1  5/2018

OTHER PUBLICATIONS

Title: Access ordering and memory-conscious cache utilization; Author: SA McKee, source: IEEE, published on 1995.*

(Continued)

*Primary Examiner* — Chameli Das
(74) *Attorney, Agent, or Firm* — Workman Nydegger (57) ABSTRACT

Storing memory reordering hints into a processor trace includes, while a system executes a plurality of machine code instructions, the system initiating execution of a particular machine code instruction that performs a load to a memory address. Based on initiation of this instruction, a system initiates storing, into the processor trace, a particular cache line in a processor cache that stores a first value corresponding to the memory address. After initiating storing of the particular cache line, and prior to committing the particular machine code instruction, the system detects an event affecting the particular cache line. Based on this detection, the system initiates storing of a memory reordering hint into the processor trace.

20 Claims, 3 Drawing Sheets

(56) References Cited

U.S. PATENT DOCUMENTS

| | | |
|---|---|---|
| 2017/0286111 A1 | 10/2017 | Pereira et al. |
| 2018/0011768 A1* | 1/2018 | Bradbury ............ G06F 11/3466 |
| 2018/0203780 A1* | 7/2018 | Mola ................... G06F 12/0802 |
| 2019/0220403 A1* | 7/2019 | Mola ................... G06F 11/3636 |

OTHER PUBLICATIONS

Title: Temporal-based procedure reordering for improved instruction cache performance, author: J Kalamationos, et al, published on 1998.*

Lee et al., "Offline Symbolic Analysis for Multi-Processor Execution Replay", In Proceedings of the 42nd Annual IEEE/ACM International Symposium on Microarchitecture, Dec. 12, 2009, pp. 564-575.

"International Search Report and Written Opinion Issued in PCT Application No. PCT/US19/055751", dated Feb. 12, 2020, 13 Pages.

Ponugoti, et al., "On-the-Fly Load Data Value Tracing in Multicores", In Proceedings of the International Conference on Compliers, Architectures, and Sythesis of Embedded Systems, Oct. 2, 2016, 10 Pages.

* cited by examiner

PROCESSOR MEMORY REORDERING HINTS IN A BIT-ACCURATE TRACE

BACKGROUND

When writing code during the development of software applications, developers commonly spend a significant amount of time "debugging" the code to find runtime errors in the code. In doing so, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging, in which execution of one or more of a program's threads are recorded/traced by tracing software and/or hardware into one or more trace files. Using some tracing techniques, these trace file(s) contain a "bit-accurate" trace of each traced thread's execution, which can be then be used to replay each traced thread's execution later for forward and backward analysis. Using bit-accurate traces, each traced thread's prior execution can be reproduced down to the granularity of its individual machine code instructions. Using these bit-accurate traces, time travel debuggers can enable a developer to set forward breakpoints (like conventional debuggers) as well as reverse breakpoints during replay of traced threads.

One form of hardware-based trace recording records a bit-accurate trace based, in part, on recording influxes to a microprocessor's cache (e.g., cache misses) during execution of each traced thread's machine code instructions by the processor. These recorded cache influxes enable a time travel debugger to later reproduce any memory values that were read by these machine code instructions during replay of a traced thread.

Modern processors are often not sequentially-consistent in their memory accesses, in order to ensure that the processor can stay as busy as practical. As a result, modern processors may reorder memory accesses relative to the order in which they appear in a stream of machine code instructions. One way in which modern processors may reorder memory accesses is by executing a thread's machine code instructions out-of-order (i.e., in a different order then the order the instructions were specified in the thread's code). For instance, a processor may execute multiple non-dependent memory loads and/or stores simultaneously across parallel execution units, rather than one-by-one as they appear in a thread's instructions. Another way in which modern processors may reorder memory accesses is by engaging in "speculative" execution of a thread's instructions—such as by speculatively pre-fetching and executing instructions after a branch prior the condition(s) that determine the outcome of the branch actually being known. Out-of-order and/or speculative execution of a thread's instructions means that the memory values relied upon by these instructions may appear in the processor's cache at times other than when a memory accessing instruction appears to have committed from an architectural perspective (and are thus reordered). In addition, the very act of speculatively pre-fetching instructions alters contents of the processor's cache, even if those instructions are not actually executed, and even if they do not access memory. The degree to which a given processor engages in out-of-order and/or speculative execution can vary depending on the instruction set architecture and implementation of the processor.

BRIEF SUMMARY

When recording the execution of one or more threads at modern processors that engage in out-of-order and/or speculative execution, cache influxes may be recorded out-of-order from the order of a thread's instructions. Due to speculative execution, some of these cache influxes may not even actually be necessary for correct replay of a traced thread's execution. Thus, debuggers that replay traces that are recorded at these processors may need to track a plurality of potential logged cache values that could have actually been used by a given instruction and determine which one renders the correct execution result. While a single correct result can be determined mathematically (e.g., by solving a graph problem based on knowledge of future program state such as memory accesses, register values, etc.), the process of actually identifying this single correct result can consume significant processing time during trace post-processing and/or replay—which can decrease post-processing and/or replay performance in consume additional processor and memory resources.

At least some embodiments described herein include microprocessor (processor) modifications that cause a processor that records the execution of a thread into a trace to also record additional memory reordering hints into the trace. These hints provide information that is usable during trace replay to help identify which memory value was actually used by a given memory accessing machine code instruction. Examples of memory reordering hints include information that can help identify how long ago a particular machine code instruction read from a particular cache line (e.g., in terms of a number of processor cycles, a number of instructions, etc.), whether or not the particular machine code instruction read a current value from the particular cache line, an indication of which value the particular machine code instruction read from the particular cache, and the like.

In addition, least some embodiments described herein could also include processor modifications that cause the processor to record additional processor state into the trace. Such additional processor state could include, for example, a value of at least one register, a hash of at least one register, an instruction count, at least a portion of a processor branch trace, and the like. Such processor state can provide additional bounds to the math problem of determining which of multiple logged cache values would render a correct execution result.

It will be appreciated that the embodiments described herein can reduce (or even eliminate) the processing needed during trace post-processing and/or trace replay for identifying which particular logged cache value(s) were consumed by a traced thread's instructions. Thus, the embodiments described herein address a technical problem uniquely arising in the realm of time travel tracing and debugging/replay. The technical solutions described herein improve the performance of traced post-processing and/or trace replay, greatly advancing the utility of time travel tracing and debugging/replay and decreasing the processing/memory resources needed during trace post-processing and/or trace replay.

In some embodiments, a system (e.g., such as a microprocessor) stores memory reordering hints into a processor trace. The system comprises one or more processing units (e.g. cores) and a processor cache comprising a plurality of cache lines. The system is configured to execute, at the one or more processing units, a plurality of machine code instructions. During this execution, the system initiates execution of a particular machine code instruction that performs a load to a memory address. Based on initiation of the particular machine code instruction, the system initiates logging, into the processor trace, a particular cache line in the processor cache that overlaps with the memory address, including initiating logging of a value that corresponds to the memory address in connection with logging the particular cache line. After initiating logging of the particular cache line into the processor trace, and prior to committing the particular machine code instruction, the system detects an event affecting the particular cache line. Based at least on detecting the event affecting the particular cache line, the system initiates storing of a memory reordering hint into the processor trace.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The inventor has recognized that there are several approaches to reducing the amount of processing needed to determine which of a plurality of recorded cache values renders the correct execution result during a trace replay. A first approach is for processor designers to alter processor design, such that processors engage in fewer memory reordering and/or speculative execution behaviors—thereby reducing the number of out-of-order cache influxes that need to be considered. The inventor has recognized that this solution is probably impractical for many modern processors, since memory reordering and/or speculative execution behaviors contribute significantly to the performance of modern processors. As a compromise, it might be possible for processor designers to cause the processor to engage in fewer memory reordering and/or speculative execution behaviors only when tracing functionality of the processor is enabled. However, doing so could alter how code is executed when tracing is enabled, versus how the same code is executed when tracing is disabled. This, in turn, could alter how programming bugs are manifest when tracing is enabled versus when tracing is disabled.

A second approach is for processor designers to provide additional documentation about the memory reordering and/or speculative execution behaviors of the processor. With the availability of more detailed documentation, the authors of time travel tracing software may be able to, for a given memory accessing instruction, identify a reduced number of logged cache values that might render the correct execution result. As a result, this additional documentation can be used to reduce the search space for identifying the correct logged cache value. However, processor designers might be reluctant to provide additional documentation about the memory reordering and/or speculative execution behaviors of the processor. For example, processor designers may desire to avoid guaranteeing particular behaviors so that they have the flexibility of altering these behaviors in future processors. Processor designers may even desire to hold these behaviors as a trade secret.

A third approach involves retaining the reordering and/or speculative execution behaviors of a processor, but it modifies the processor so that the processor provides additional trace data when it engages in observable memory reordering behaviors. Such additional trace data could be, for example, a hint as to what the processor actually did. More particularly, in this third approach, when the processor engages in an observable memory reordering behavior the processor can record into a processor trace additional information that can be used later to identify which particular cache value a given instruction actually consumed. In accordance with this third approach, at least some embodiments described herein include processor modifications that cause a processor that records the execution of a thread into a trace to also record additional memory reordering hints into the trace. These hints provide information that is usable during trace replay to help identify which memory value was actually used by a given memory accessing machine code instruction. Examples of memory reordering hints include information that can help identify how long ago a particular machine code instruction read from a particular cache line (e.g., in terms of a number of processor cycles, a number of instructions, etc.), whether or not the particular machine code instruction read a current value from the particular cache line, an indication of which value the particular machine code instruction read from the particular cache, and the like.

A fourth approach also involves retaining the reordering and/or speculative execution behaviors of a processor, but it modifies the processor so that the processor records additional processor state which can be used to provide additional bounds to the math problem of determining which of multiple logged cache values would render a correct execution result. In accordance with this fourth approach (which can be used individually, or in combination with the third approach), at least some embodiments described herein include processor modifications that cause the processor to record additional processor state into the trace. Such additional processor state could include, for example, a value of at least one register, a hash of at least one register, an instruction count, at least a portion of a processor branch trace, and the like. Such processor state can provide additional bounds to the math problem of determining which of multiple logged cache values would render a correct execution result.

Figure 1:
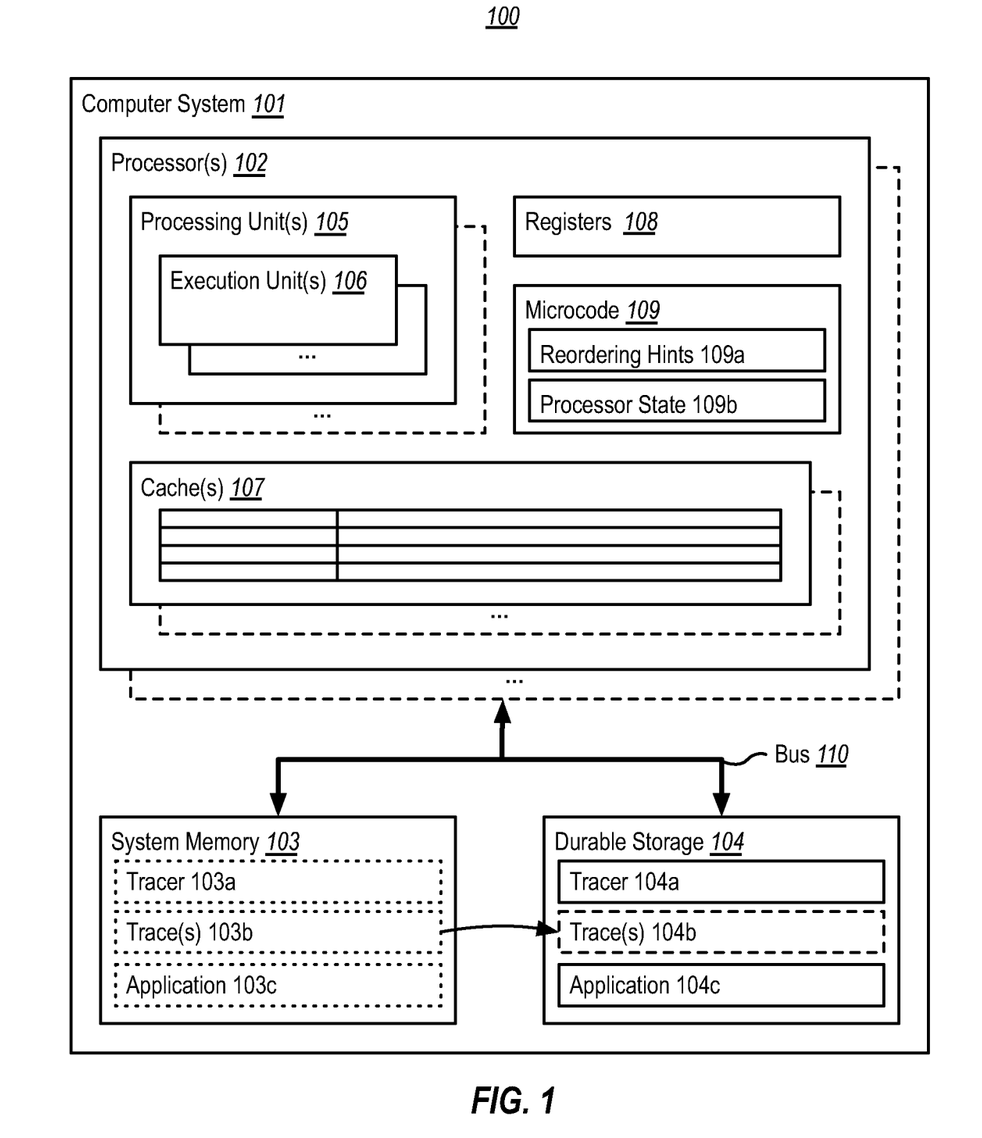
FIG. 1 illustrates an example computer architecture that facilitates storing memory reordering hints and/or snapshots of processor state into a processor trace.

To the accomplishment of the third and/or fourth approaches introduced above, FIG. 1 illustrates an example computer architecture 100 that facilitates storing memory reordering hints and/or snapshots of processor state into a processor trace. FIG. 1 illustrates that a computer system 101 can include (among other things) one or more processors 102, system memory 103 (e.g., random access memory), and durable storage 104 (e.g., a magnetic storage medium, a solid-state storage medium, etc.), which are communicatively coupled using a communications bus 110.

As shown, durable storage 104 might store (among other things) a tracer 104a, one or more traces 104b, and an application 104c. During operation of computer system 101, the processor 102 can load the tracer 104a and the application 104c into system memory 103 (i.e., shown as tracer 103a and application 103b). In embodiments, the processor(s) 102 execute machine code instructions of application 103b, and during execution of these machine code instructions, the tracer 103a causes the processor(s) 102 to record a bit-accurate trace of execution of those instructions. This bit-accurate trace can be recorded based, at least in part, on recording cache influxes to cache(s) 107 (discussed later) caused by execution of those instructions. This trace can be stored in system memory 103 (i.e., shown as trace(s) 103b) and, if desired, can also be persisted to the durable storage (i.e., as indicated by the arrow between trace(s) 103b and trace(s) 104b).

FIG. 1 details some of the components of each processor 102 that can implement the embodiments herein. As shown, each processor 102 can include (among other things) one or more processing units 105 (e.g., processor cores), one or more cache(s) 107 (e.g., a level-1 cache, a level-2, cache, etc.), a plurality of registers 108, and microcode 109. In general, each processor 102 loads machine code instructions (e.g., of application 103c) from system memory 103 into the cache(s) 107 (e.g., into a "code" portion of the cache(s) 107) and executes those machine code instructions using one or more of the processing units 105. During their execution, the machine code instructions can use registers 108 as temporary storage locations and can read and write to various locations in system memory 103 via the cache(s) 107 (e.g., using a "data" portion of the cache(s) 107). While operation of the various components of each processor 102 is controlled in large part by physical hardware-based logic (e.g., implemented using transistors), operation of the various components of each processor 102 can also be controlled, at least in part, using software instructions contained in processor microcode 109.

As shown, each of the processing units 105 includes a plurality of execution units 106. These execution units 106 can include, for example, arithmetic logic units, memory units, etc. In modern processors, each processing unit 105 might include multiples of each type of execution unit and might arrange these execution units 106 in a manner that enables parallel execution of machine code instructions. As such, each processing unit 105 can work to execute a plurality of machine code instructions (e.g., from application 103c) in parallel. Each processing unit 105 can be viewed as containing a processing "pipeline" that can continuously (or periodically) receive an influx of new machine code instructions; the size and length of this pipeline (e.g., how many instructions it can handle at once, and how long it takes to complete execution of each instruction) is defined, at least in part, by the number, identity, and arrangement of execution units 106.

In some processor implementations, parallel execution of machine code instructions is accomplished by the processing unit 105 loading a series of machine code instructions (e.g., a fixed number of bytes) from the cache(s) 107 and decoding these machine code instructions into micro-operations (μops) that execute on the execution units 106. After decoding instructions into μops, the processing unit 105 dispatches these μops for execution at the execution units 106. Other processor implementations might instead execute machine code instructions directly at the execution units 106 without decoding them to μops.

Figure 2A:
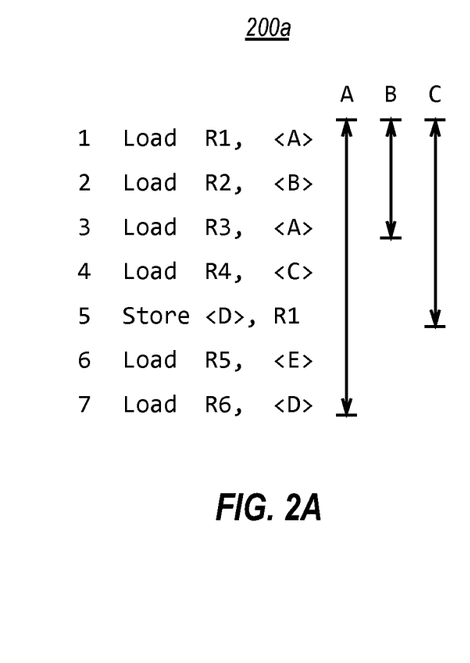
FIG. 2A illustrates a first example of a block of machine code and corresponding memory value lifetimes.

FIG. 2A illustrates an example 200a that includes a series of machine code instructions that might be loaded from the cache(s) 107 and decoded into μops by processing unit 105. These machine code instructions include a plurality of load instructions (i.e., instructions 1-4, 6, and 7)—each of which loads a value from a memory location (memory locations A-D) into a register (registers R1-R6)—and a store instruction (i.e., instruction 5) that stores the value contained in a register (i.e., register R1) into a memory location (i.e., memory location D). Processing unit 105 might decode each of these loads and stores into μops that are executable at execution units 106.

During the decoding and/or dispatching process for a given series of machine code instructions, processing unit 105 might identify a plurality of machine code instructions in the series that lack dependencies on each other (e.g., independent loads or stores, independent math operations, etc.) and dispatch their μops for parallel execution at the execution units 106. Additionally, or alternatively, processing unit 105 might identify machine code instructions that may, or may not, execute depending on the outcome of a branch/condition, and choose to speculatively dispatch their μops for parallel execution at the execution units 106.

For example, referring again to FIG. 2A, processing unit 105 might determine that the loads of instructions 1-4 are not dependent on one another (i.e., they need not be performed serially as they appear in the series of instructions). As such, processing unit 105 might dispatch the μops corresponding to instructions 1-4 for parallel execution at the execution units 106. These μops can then proceed to carry out the loads. This could include, for example, the execution units 106 identifying one or more memory values already stored in the cache(s) 107, the execution units 106 initiating one or more cache misses if a load's requested memory location is not already stored in the cache 107, etc. Notably, the amount of time (e.g., processor clock cycles) it takes for the μops of a given instruction to execute can vary depending on the state of the processor 102 (e.g., existing μops executing at execution units 106, existing contents of the cache(s) 107, concurrent activity by other processing units 105, etc.). For example, even though the μops corresponding to instructions 1-4 might be initially dispatched at the same time, each instruction's μops might not complete at that same time.

Eventually, the execution units 106 may complete the μops for a given instruction, and the processing unit 105 can "commit" (sometimes referred to as "retire") the instruction. Most processing units commit instructions in the order in which they were originally specified in the application 104c's code, regardless of the order in which the μops for those instructions were dispatched and/or completed. Thus, from an architectural standpoint, processing unit 105 can appear to have executed a series of instructions in-order, even though these instructions may have been executed out-of-order internally at the processing unit 105. An instruction is often referred to as being "in-flight" from the time its execution is initiated at the execution units 106 to the time it is committed.

If the processing unit 105 engages in speculative execution, it may initiate execution of instructions that may not actually need to execute. For example, the instructions of FIG. 2A might be instructions that should only be executed if the condition of a prior branch instruction is met. In order to keep the execution units 106 "busy" the processing unit 105 may nonetheless initiate their execution at the execution units 106 prior to the branch instruction committing. If the condition is later found to have been met (i.e., when the branch instruction commits), these speculatively-executed instructions can be committed when their μops complete. If, on the other hand, the condition is later found to have been not met, the processing unit 105 can refrain from committing these speculatively-executed instructions. In this second circumstance, execution of the μops for these speculatively-executed instructions may have observable effects on processor state, though the instructions did not commit. For example, these μops may have caused cache misses—resulting in data being brought into (and evicted from) the cache(s) 107—even if these cache misses were not ultimately consumed (i.e., because the speculative instruction that caused the cache miss was not committed).

As a side effect of out-of-order and/or speculative execution, the order of influxes of data to the cache(s) 107 (i.e., cache misses) may lack correspondence with the order in which machine code instructions appeared to have executed. In addition, the lifetime of that data once it is in the cache(s) 107 may lack correspondence with the cache lifetime that might be expected based on the order in which machine code instructions appeared to have executed. If unused cache misses from speculative execution are logged to the trace(s) 103b, these cache misses add log data that is ultimately not needed for correct reply of the trace(s) 103b, but that might result in ambiguity as to which value a given instruction actually read. Further complications can also arise due to concurrent execution of other threads, since those threads can further cause cache misses, evictions, and invalidation. As alluded to previously, all of this means that, when replaying a trace that is based on recording cache misses, additional processing may be needed to determine which logged cache value(s) were actually read by a given machine code instruction.

Some implementations of cache-based trace recording might log cache evictions and/or invalidations, in addition to cache influxes. Thus, the trace(s) 104b can contain information sufficient to determine when a cache line was initially brought into the cache(s) 107, as well as when that cache line was later evicted from the cache(s) 107 or invalidated within the cache(s) 107. This means that trace replay software can determine the total lifetime of a particular cache line in the cache(s) 107.

For example, FIG. 2A shows one example 200a of possible lifetimes for cache lines corresponding to memory locations A, B, and C. As shown by the arrows in FIG. 2A, in example 200a these cache lines were all brought into the cache(s) 107 prior to the load at instruction 1 committing (e.g., because these loads at instructions 1-4 were all initiated in parallel). As also shown by the arrows in FIG. 2A, in example 200a the cache line for memory location A remained valid in the cache until the load at instruction 7 committed, the cache line for memory location B remained valid in the cache until the load at instruction 3 committed, and the cache line for memory location C remained valid in the cache until the load at instruction 5 committed. With these example lifetimes, trace replay software can readily identify which logged cache values correspond to the relevant loads (i.e., the loads at instructions 1-4, which read memory locations A-C). This is because, at the time that each relevant load instruction committed, there was a present and valid cache line that the load could have read from.

Figure 2B:
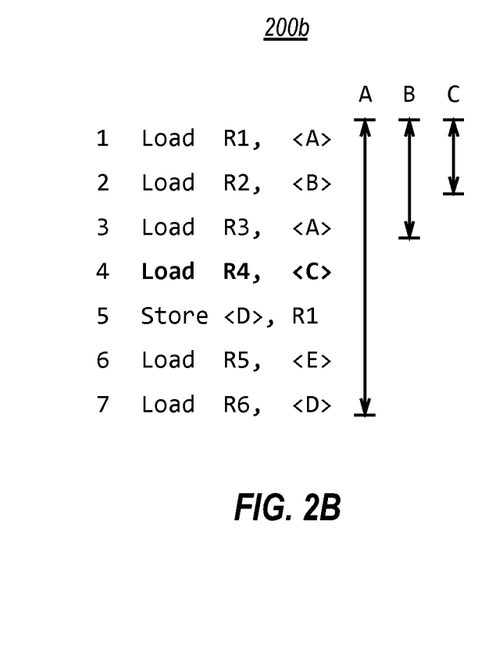
FIG. 2B illustrates a second example of a block of machine code and corresponding memory value lifetimes that may present replay challenges.
Figure 2C:
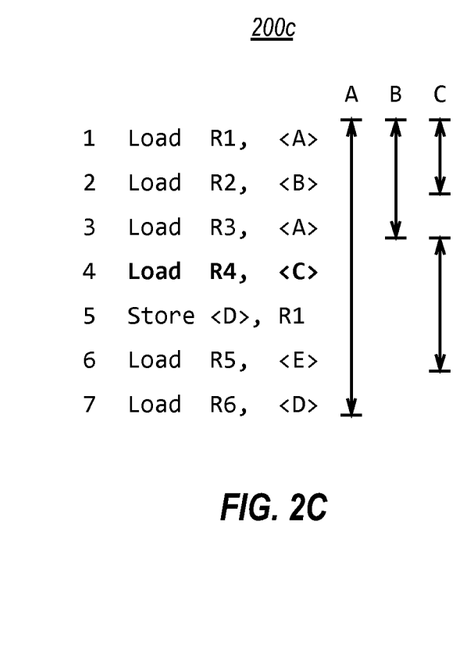
FIG. 2C illustrates a third example of a block of machine code and corresponding memory value lifetimes that may present replay challenges.

While reordering may not have presented significant replay challenges in the example 200a of FIG. 2A, FIGS. 2B and 2C illustrate examples 200b, 200c in which reordering might present replay challenges. The example 200b of FIG. 2B includes the same series of machine code instructions as the example 200a of FIG. 2A, along with the same cache line lifetimes for the cache lines corresponding to memory locations A and B. However, unlike example 200a, in example 200b the cache line for memory location C only remains valid in the cache until the load at instruction 2 committed. This means that, prior to the load at instruction 4 committing, the cache line corresponding to the memory location that the load was reading was invalidated or evicted. This invalidation/eviction prior to the load committing (i.e., while it was in-flight) can present challenges when replay software considers the load at instruction 4 during replay. For example, the replay software may need to determine if it could be been legal for the load at instruction 4 to have read from this cache line, even though the cache line was invalidated/evicted prior to the load committing.

The example 200c of FIG. 2C also includes the same series of machine code instructions as the example 200a of FIG. 2A, along with the same cache line lifetimes for the cache lines corresponding to memory locations A and B. However, in example 200c the cache line for memory location C was valid in the cache 107 from prior to the load at instruction 1 until the load at instruction 2 committed, and then again from committing of the load at instruction 3 to the committing of the load at instruction 6. Assuming the values for memory location C are the same during these two validity periods, replay software does not need to distinguish between these two validity periods when considering the load at instruction 4. However, if the values are different in the two validity periods, then replay software will need to determine which of these two values was actually read by the load at instruction 4. Thus, this change in the value of the cache line prior to the load committing (i.e., while it was in-flight) can also present challenges when replay software considers the load at instruction 4 during replay.

In order to assist replay software in determining which cache line(s) are valid for a load and/or which cache value was read, embodiments include processor modifications that detect situations in which out-of-order and/or speculative execution may have caused observable effects, and that store one or more memory reordering hints as a result. These processor modifications are symbolically depicted in FIG. 1 as reordering hints logic 109a within microcode 109, however it will be appreciated that these processor modifications could potentially be implemented as physical logic changes in addition to (or instead of) microcode 109 changes.

In general, the reordering hints logic 109a detects situations in which (i) execution of a machine code instruction that performs a load from a memory address is initiated (e.g., its µops are dispatched to execution units 106); (ii) execution of the machine code instruction results in a particular cache line in the cache(s) 107 (i.e., a cache line overlapping with the memory address) being logged to the trace(s) 103; and (iii) after logging the particular cache line—but prior to committing the machine code instruction—it is determined that an event has affected the particular cache line in the cache. This could happen, for example, because the cache line was evicted or invalidated, because the cache line was written to, because of a loss of a read lock on the particular cache line, etc. When this happens, the reordering hints logic 109*a* might cause the processor 102 to record one or more memory reordering hints into the trace(s) 103*b*. In general, memory reordering hints can comprise any data that can be used to aid replay software in identifying which cache line(s) are valid for the machine code instruction and/or which value was read by the machine code instruction. Notably, if an instruction never commits (e.g., because it was speculatively executed and later found to not be needed), the reordering hints logic 109*a* might refrain from recording any hints for that instruction.

In embodiments, the reordering hints logic 109*a* might record memory reordering hints only in situations in which a memory access behavior has deviated from a defined "general" behavior. For example, processor 102 may define a general behavior as being that an instruction generally uses the value that was in the cache(s) 107 at the time that the instruction committed. Then, the reordering hints logic 109*a* might record a reordering hint only when an instruction used (or may have used) a value other than the value that was in the cache(s) 107 at the time that the instruction committed. In other words, the reordering hints logic 109*a* might record a reordering hint only when an "old" value (e.g., from the logged cache line above) was used by an instruction, as opposed to when a "new" or "current" value (e.g., resulting from a subsequent cache invalidation/eviction, or cache line write) was used by an instruction. In this way, a reordering hint is only recorded when normal behaviors are deviated from, and lack of a reordering hint contains implicit knowledge (e.g., that the current value was used). Thus, in these embodiments, a reordering hint might be stored only when the event that affected the particular cache line changed its value, and when the processor used the old value.

For example, returning to FIG. 2B, if the reordering hints logic 109*a* were to detect that the cache line corresponding to memory address C was invalided/evicted prior to committing of the load at instruction 4, the reordering hints logic 109*a* might record a hint indicating how long ago the load at instruction 4 read from the cache line, or how long ago the load at instruction 4 could have read from the cache line (i.e., how long the processor pipeline/readahead window is). This could be expressed, for example, in terms of a number of processor cycles, a number of instructions, and the like. Returning also to FIG. 2C, if the reordering hints logic 109*a* were to detect that the memory value corresponding to memory address C had changed prior to committing of the load at instruction 4, the reordering hints logic 109*a* might record an indication of which memory value was read. This could be expressed in terms of how long ago the load at instruction 4 read from the cache line, whether or not the load at instruction 4 read a current value from the cache line, or even what value the was read by the load at instruction 4.

In some embodiments, the reordering hints logic 109*a* might be probabilistic. For example, if the reordering hints logic 109*a* records hints when instructions use a value other than the current value at the time of instruction commitment, the reordering hints logic 109*a* might also record hints when it is not certain if an instruction used current value at the time of instruction commitment. Additionally, the reordering hints logic 109*a* could even record the probability that the most recent value was (or wasn't) used. Recording probabilities enables replay software to narrow the search space by testing most probably paths first. For example, a 0% probability could mean that reordering hints logic 109*a* is certain a prior value was used, and a 100% probability (or no data packet, if the data is implicit) could mean that that reordering hints logic 109*a* is certain that the current value was used. Values between 0% and 100% could specify the probability that current value was used. A different number of bits could be used for different granularities of probabilities. For example, {100%, 0%} in one bit, {100%, 99-50%, 49-1%, 0%} in two bits, {100%, 99-90%, 89-51%, 50%, 49-10%, 9-1%, 0%} in three bits, {100%=0xFF, 0%=0x00, other values, =probability*256} in 8 bits, floating point values, etc.

Figure 3:
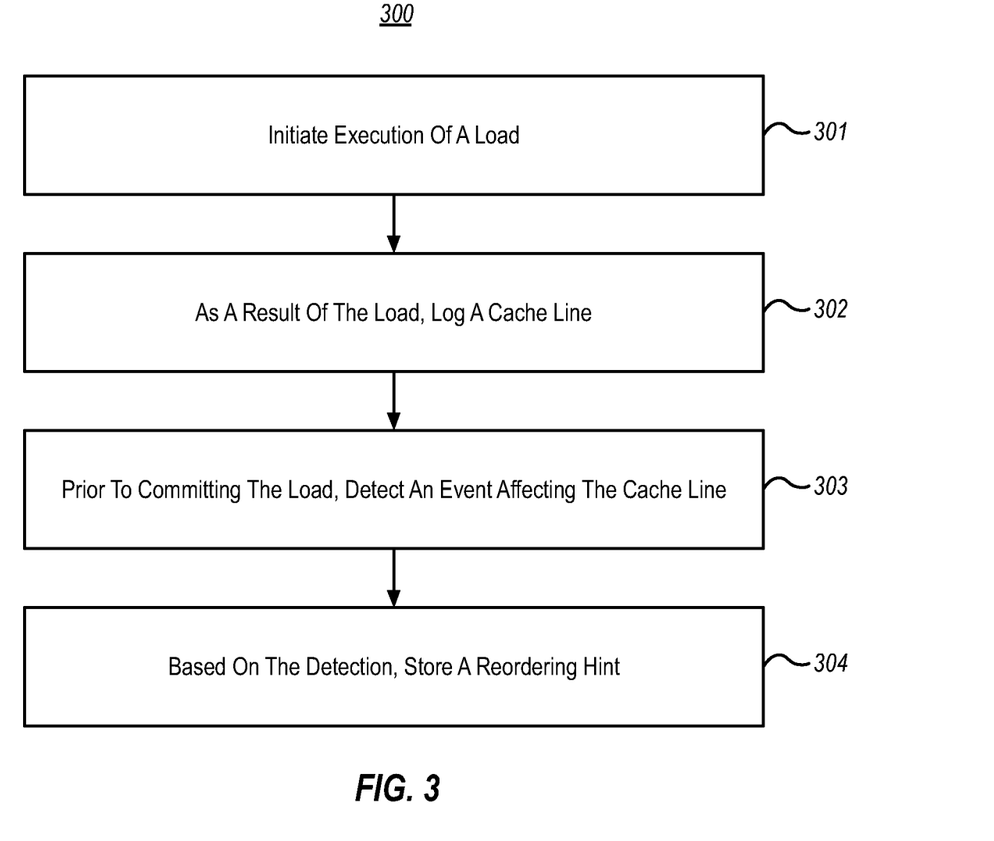
FIG. 3 illustrates a flow chart of an example method for storing memory reordering hints into a processor trace.

In view of the foregoing, FIG. 3 illustrates a flow chart of an example method 300 for storing memory reordering hints into a processor trace. In general, method 300 is implemented at computing system (e.g., processor 102) that includes one or more processing units (e.g., processing units 105) and a processor cache (e.g., cache(s) 107) comprising a plurality of cache lines. Method 300 might be implemented in environments in which a processor does not normally log processor state (e.g., registers such as the instruction pointer, instruction counts, etc.). Method 300 will be described in reference to the computer architecture 100 of FIG. 1, and the examples 200*b* and 200*c* of FIGS. 2B and 2C.

As shown in FIG. 3, method 300 includes an act 301 of initiating execution of a load. In some embodiments, act 301 comprises, while executing a plurality of machine code instructions at the one or more processing units, initiating execution of a particular machine code instruction that performs a load to a memory address. For example, while tracing execution of a thread of application 104*c* at processing unit 105, processing unit 105 may fetch a series of instructions of application 104*c*, such as the series shown in examples 200*b* and 200*c*, from the cache(s) 107. The processing unit 105 may then decode one or more of these instructions into µops and dispatch these µops for execution at execution units 106. As part of this fetch/decode process, the processing unit 105 might decode the load at instruction 4 and dispatch its µops for execution at execution units 106.

Method 300 also includes an act 302 of, as a result of the load, logging a cache line. In some embodiments, act 302 comprises, based on initiation of the particular machine code instruction initiating logging, into the processor trace, a particular cache line in the processor cache that overlaps with the memory address, including initiating logging of a value that corresponds to the memory address in connection with logging the particular cache line. For example, based on the execution of the µops for the load at instruction 4 at the execution units 106, the execution units 106 may cause a cache miss based on accessing the memory address (i.e., address C) that is used by the load, resulting in a value in system memory 103 corresponding to memory address C being loaded into a cache line in the cache(s) 107. Alternatively, the µops for the load at instruction 4 might read the value from a cache line already existing in the cache(s) 107. As a result of the load, this value may then be logged into the trace(s) 103*b*. This logging might occur in connection with the load, or at some other time. In FIG. 2B, the lifetime of this cache line might be represented by the arrow corresponding to memory address C, and in FIG. 2C the lifetime of this cache line might be represented by one of the arrows corresponding to memory address C.

Method 300 also includes an act 303 of, prior to committing the load, detecting an event affection the cache line. In some embodiments, act 303 comprises, after initiating logging of the particular cache line into the processor trace, and prior to committing the particular machine code instruction, detecting an event affecting the particular cache line. For example, in the context of FIG. 2B, the reordering hints logic 109a (e.g., microcode and/or physical logic) might detect that the cache line corresponding to memory address C was evicted or invalidated prior to the load at instruction 4 committing (and, thus, there was an invalidation or eviction of the particular cache line prior to committing the particular machine code instruction). In another example, in the context of FIG. 2C, the reordering hints logic 109a (e.g., microcode and/or physical logic) might detect that (i) the first cache line corresponding to memory address C was evicted/invalidated prior to the load at instruction 4 committing, and that (ii) a new cache line having a different value for memory address C was brought into the cache prior to the load at instruction 4 committing (and, thus, there was a change in the particular cache line that includes a change in the stored value corresponding to the memory address prior to committing the particular machine code instruction). Other events could include a write to the particular cache line, a loss of a read lock on the particular cache line, and the like, that might result in a change in the value of the cache line after it was logged. These situations could have been caused by speculative execution, activity by other threads, etc.

Method 300 also includes an act 304 of, based on the detection, storing a reordering hint. In some embodiments, act 304 comprises, based at least on detecting the event affecting the particular cache line, initiating storing of a memory reordering hint into the processor trace. For example, in the context of FIG. 2B, the reordering hints logic 109a could store into the trace(s) 103b a hint of how long ago the particular machine code instruction read from the particular cache line or how long ago the particular machine code instruction could have read from the particular cache line. As was discussed, this could be expressed in terms of a number of processor cycles, a number of instructions, etc., that describes a size of the processor's readahead window. In the context of FIG. 2C, the reordering hints logic 109a could store into the trace(s) 103b an indication of which memory value was read, such as whether or not the particular machine code instruction read a current value from the particular cache line, or an indication of which value the particular machine code instruction read from the particular cache.

As was mentioned, some embodiments might record memory reordering hints only in situations in which a memory access behavior has deviated from a defined general behavior. For example, if the general behavior us that an instruction generally uses the value that was in the cache(s) at the time that the instruction committed, then act 304 might initiate storing of the memory reordering hint into the processor trace only when the particular machine code instruction loads the value that was logged in act 302 (i.e., when it did not load a new value resulting from the event affecting the particular cache line, and thus it loaded an old value).

As was also mentioned, bit-accurate tracing can include recording not only cache influxes, but also cache evictions and/or invalidations. Thus, method 300 can include, initiating storing into the processor trace a record of least one of: a later invalidation of the particular cache line, or a later eviction of the particular cache line (i.e., recording a corresponding cache line eviction/invalidation into the trace(s) 103b). These records can be used during replay to identify values brought into the cache(s) 107, as well as their lifetimes. This lifetime information can be combined with reordering hints to help identify which particular cache value a particular instruction read.

Accordingly, embodiments can include processor modifications that cause a processor to record memory reordering hints into a trace. These hints provide information that is usable during trace replay to help identify which memory value was actually used by a given memory accessing machine code instruction. These hints can significantly reduce the processing needed to carry out trace replay.

As was mentioned, some embodiments may additionally (or alternatively) record extra processor state into the trace(s) 103b. This state can provide additional information about program state, adding bounds to the math problem of determining which of multiple logged cache values would render a correct execution result. Thus, embodiments can include processor modifications that record extra state into the trace(s) 103b periodically or continuously. These processor modifications are symbolically depicted in FIG. 1 as a processor state logic 109b within microcode 109. However, similar to reordering hints logic 109a, it will be appreciated that these processor modifications could potentially be implemented as physical logic changes in addition to (or instead of) microcode 109 changes.

The processor state logic 109b may record snapshots of periodic processor state at regular intervals (e.g., based on a number of instructions that have executed since the last snapshot, a number of processor clock cycles that have elapsed since the last snapshot, etc.). In each snapshot, the processor state logic 109b may record any state that can be used to help constrain the math problem of determining which of multiple logged cache values would render a correct execution result. Examples of available processor state include the value(s) of one or more registers, a hash of the value(s) of one or more registers, an instruction count (e.g., of the next instruction to be executed, of the last instruction committed, etc.), and the like.

In some embodiments, the processor state logic 109b may even record a more continuous stream of additional processor state. For example, many modern processors include functionality for generating a "branch trace," which is a trace that indicates which branches were taken/not taken in executing code. Examples of branch tracing technology include INTEL PROCESSOR TRACE and ARM PROGRAM TRACE MACROCELL. When a branch trace is available, the processor state logic 109b might record all, or a subset, of this branch trace into the trace(s) 103b. For example, the processor state logic 109b could record an entire branch trace (e.g., as a separate data stream in the trace(s) 103b), the processor state logic 109b could record a sampling of the branch trace (e.g., the result of each indirect jump, plus the results of a defined number of jumps after the indirect jump or a defined number of bytes of branch trace data after the indirect jump), and/or the processor state logic 109b could record subset of the branch trace (e.g., the outcomes of indirect jumps only).

In view of the foregoing, it will be appreciated that method 300 could also include initiating storing of additional processor state into the processor trace. This processor state could comprise, for example, one or more of a value of at least one register, a hash of at least one register, an instruction count, and/or at least a portion of a branch trace.

This data could be recorded as periodic snapshots, or as a more continuous data stream. If the processor state comprises a portion of the branch trace, the processor state could comprise at least one of a sampling of the branch trace or a subset of the branch trace.

Accordingly, embodiments can also include processor modifications that cause the processor to record additional processor state into the trace. Such additional processor state could include snapshots of register values, hashes of register values, instruction counts, and the like. Such additional processor state could additionally, or alternatively, include at least a portion of a processor branch trace. This recorded processor state can provide additional bounds to the math problem of determining which of multiple logged cache values would render a correct execution result, reducing the processing needed to carry out trace replay.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A system that stores memory reordering hints into a processor trace, the system comprising:
    one or more processing units;
    a processor cache comprising a plurality of cache lines; and
    logic that is configured to perform at least the following while executing, at the one or more processing units, a plurality of machine code instructions:
        initiate execution of a particular machine code instruction that performs a load to a memory address;
        based on initiation of the particular machine code instruction, initiate logging, into the processor trace, a particular cache line in the processor cache that overlaps with the memory address, including initiating logging of a value that corresponds to the memory address in connection with logging the particular cache line;
        after initiating logging of the particular cache line into the processor trace, and prior to committing the particular machine code instruction, detect an event affecting the particular cache line; and
        based at least on detecting the event affecting the particular cache line, initiate storing of a memory reordering hint into the processor trace.

2. The system as recited in claim 1, wherein the event affecting the particular cache line is selected from the group consisting of an invalidation of the particular cache line, an eviction of the particular cache line, a write to the particular cache line, or a loss of a read lock on the particular cache line.

3. The system as recited in claim 2, wherein the event comprises invalidation or eviction of the particular cache line.

4. The system as recited in claim 2, wherein the event comprises the write to the particular cache line.

5. The system as recited in claim 1, wherein the system initiates storing of the memory reordering hint into the processor trace only when the particular machine code instruction loads the value that was logged in connection with the particular cache line.

6. The system as recited in claim 1, wherein the memory reordering hint comprises at least one of:
    how long ago the particular machine code instruction read from the particular cache line;
    whether or not the particular machine code instruction read a current value from the particular cache line; or
    an indication of which value the particular machine code instruction read from the particular cache.

7. The system as recited in claim 6, wherein the memory reordering hint comprises how long ago the particular machine code instruction read from the particular cache line, and wherein the memory reordering hint comprises at least one of: a number of processor cycles or a number of instructions.

8. The system as recited in claim 1, wherein the system initiates storing of a size of a readahead window into the processor trace.

9. The system as recited in claim 1, wherein the system also initiates storing into the processor trace a record of least one of:
    a later invalidation of the particular cache line, or
    a later eviction of the particular cache line.

10. The system as recited in claim 1, wherein the system also initiates storing of additional processor state into the processor trace.

11. The system as recited in claim 10, wherein the processor state comprises at least one of:
    a value of at least one register;
    a hash of at least one register;
    an instruction count; or
    at least a portion of a branch trace.

12. The system as recited in claim 11, wherein the processor state comprises the portion of the branch trace, and wherein the portion of the branch trace comprises at least one of a sampling of the branch trace or a subset of the branch trace.

13. The system as recited in claim 11, wherein the processor state comprises the portion of the branch trace, and wherein the branch trace comprises at least one of INTEL PROCESSOR TRACE or ARM PROGRAM TRACE MACROCELL.

14. The system as recited in claim 1, wherein the logic comprises processor microcode.

15. A method, implemented at a computing system that includes one or more processing units and a processor cache comprising a plurality of cache lines, for storing memory reordering hints into a processor trace, the method comprising:
    while executing, at the one or more processing units, a plurality of machine code instructions, initiating execution of a particular machine code instruction that performs a load to a memory address;
    based on initiation of the particular machine code instruction, initiating logging, into the processor trace, a particular cache line in the processor cache that overlaps with the memory address, including initiating logging of a value that corresponds to the memory address in connection with logging the particular cache line;
    after initiating logging of the particular cache line into the processor trace, and prior to committing the particular machine code instruction, detecting an event affecting the particular cache line; and
    based at least on detecting the event affecting the particular cache line, initiating storing of a memory reordering hint into the processor trace.

16. The method of claim 15, wherein the event affecting the particular cache line is selected from the group consisting of an invalidation of the particular cache line, an eviction of the particular cache line, a write to the particular cache line, or a loss of a read lock on the particular cache line.

17. The method of claim 15, wherein the memory reordering hint comprises at least one of:
   how long ago the particular machine code instruction read from the particular cache line;
   whether or not the particular machine code instruction read a current value from the particular cache line; or
   an indication of which value the particular machine code instruction read from the particular cache.

18. The method of claim 17, wherein the memory reordering hint comprises how long ago the particular machine code instruction read from the particular cache line, and wherein the memory reordering hint comprises at least one of: a number of processor cycles or a number of instructions.

19. The method of claim 15, wherein the system periodically initiates storing of processor state into the processor trace, including at least one of a value of at least one register, a hash of at least one register, an instruction count, or at least a portion of a branch trace.

20. A microprocessor comprising:
   one or more processor cores;
   a cache comprising a plurality of cache lines; and
   processor microcode that performs at least the following:
      execute, at the one or more processor cores, a plurality of machine code instructions; and
      while executing the plurality of machine code instructions, initiate execution of a particular machine code instruction that performs a load to a memory address;
      based on initiation of the particular machine code instruction, initiate logging, into a processor trace, a particular cache line in the processor cache that overlaps with the memory address, including initiating logging of a value that corresponds to the memory address in connection with logging the particular cache line;
      after initiating logging of the particular cache line into the processor trace, and prior to committing the particular machine code instruction, detect an event affecting the particular cache line; and
      based at least on detecting the event affecting the particular cache line, initiate storing of a memory reordering hint into the processor trace.

* * * * *